United States Patent
Maxson

(10) Patent No.: US 8,223,663 B2
(45) Date of Patent: Jul. 17, 2012

(54) CHARACTERIZING HOME WIRING VIA AD HOC NETWORKING

(76) Inventor: Ben Maxson, Beech Grove, IN (US)

( * ) Notice: Subject to any disclaimer, the term of this patent is extended or adjusted under 35 U.S.C. 154(b) by 454 days.

(21) Appl. No.: 12/273,061

(22) Filed: Nov. 18, 2008

(65) Prior Publication Data

US 2009/0135732 A1    May 28, 2009

Related U.S. Application Data

(60) Provisional application No. 60/990,798, filed on Nov. 28, 2007.

(51) Int. Cl.
*G01R 31/08* (2006.01)
*G06F 11/00* (2006.01)
(52) U.S. Cl. .................... 370/252; 370/247
(58) Field of Classification Search ............. 324/534, 324/628, 616
See application file for complete search history.

(56) References Cited

U.S. PATENT DOCUMENTS

| | | | |
|---|---|---|---|
| 5,202,985 A | 4/1993 | Goyal | 707/4 |
| 5,606,664 A | 2/1997 | Brown et al. | 709/224 |
| 5,734,824 A | 3/1998 | Choi | 709/224 |
| 5,751,965 A * | 5/1998 | Mayo et al. | 709/224 |
| 6,205,122 B1 | 3/2001 | Sharon et al. | 370/254 |
| 6,535,580 B1 | 3/2003 | Strauss et al. | 379/27.01 |
| 6,614,236 B1 * | 9/2003 | Karam | 324/532 |
| 6,807,573 B2 | 10/2004 | Saito et al. | 709/220 |
| 7,234,115 B1 | 6/2007 | Sprauve et al. | 715/746 |
| 2002/0147561 A1 | 10/2002 | Baracat et al. | 702/119 |
| 2003/0009537 A1 | 1/2003 | Wang | 709/219 |
| 2003/0037292 A1 | 2/2003 | Bullman et al. | 714/43 |
| 2004/0232919 A1 * | 11/2004 | Lacey | 324/533 |
| 2006/0176044 A1 | 8/2006 | Binder et al. | 324/71.1 |
| 2006/0274673 A1 | 12/2006 | Fleury et al. | 370/254 |
| 2007/0116184 A1 * | 5/2007 | Gonsalves et al. | 379/1.01 |
| 2007/0290693 A1 * | 12/2007 | Gotwals et al. | 324/534 |
| 2008/0055067 A1 * | 3/2008 | Curt et al. | 340/538.12 |

FOREIGN PATENT DOCUMENTS

EP    1563643    1/2007

* cited by examiner

*Primary Examiner* — Anh-Vu Ly
*Assistant Examiner* — Maharishi Khirodhar
(74) *Attorney, Agent, or Firm* — Matthew A. Pequignot; Pequignot + Myers LLC

(57) ABSTRACT

The invention is a method of measuring the RF losses among home wiring endpoints using battery-powered "remotes" placed at each accessible endpoint in the home. The remotes use a low power, ad hoc networking technology, e.g. Zigbee, Z-wave, to connect to one another over the home wiring, rather than over the air via antennas as in typical applications of these technologies.

7 Claims, 7 Drawing Sheets

| | METER | REMOTE 1 | REMOTE 2 | REMOTE 3 | REMOTE 4 |
|---|---|---|---|---|---|
| METER | | -6.8 | -16.7 | -18.3 | -24.6 |
| REMOTE 1 | | | -32.1 | -33.7 | -40.0 |
| REMOTE 2 | | | | -43.6 | -49.9 |
| REMOTE 3 | | | | | -39.3 |
| REMOTE 4 | | | | | |

CHARACTERIZING HOME WIRING VIA AD HOC NETWORKING

CROSS-REFERENCE TO RELATED APPLICATIONS

The present invention claims priority from U.S. Patent Application No. 60/990,798 filed, Nov. 28, 2007, which is incorporated herein by reference.

TECHNICAL FIELD

The present invention relates to a testing system for mapping a home network, and in particular to a test meter with a plurality of remotes networked together for characterizing a coaxial cable home network.

BACKGROUND OF THE INVENTION

With the advent of new and different home networking technologies, e.g. Multi-media Over Coaxial Alliance (MOCA), Home Phoneline Networking Alliance (HPNA), High-definition Audio-video Network Alliance (HANA), etc., the ability to rapidly characterize a network of home wiring, particularly coaxial cabling, is becoming more critical to enable technicians to determine what portions, if any, of a client's home network are suitable for certain end devices, e.g. Set Top Boxes (STB), Cable Modems etc.

The installer's primary interest is in determining the amount of RF attenuation among the wiring endpoints, at which the end devices, e.g. an STB, are going to be placed. Should the measured attenuation be too great, the first troubleshooting step is to determine the topology of the network, i.e. the length of the wiring, and the components in the wiring, such as splitters, diplexers, amplifiers, etc., and, if possible, the loss through each of these components.

Prior art testing systems, such as those disclosed in United States Patent Publication 2003/0037292, entitled Remote Management and Analysis Techniques in Home Phoneline Networks, published Feb. 20, 2003 in the name of Bullman et al., provide a frequency response of the network under test, but do not characterize individual sections of the network. United States Patent Publication 2006/0274673, entitled Method for Determining Connection Topology of Home Network, published Dec. 7, 2006 in the name of Fleury et al., discloses characterizing all of the nodes in a home network by sending test signals therebetween, but does not characterize network sections between endpoints.

An object of the present invention is to overcome the shortcomings of the prior art by providing a test system that measures individual path loss at a particular frequency between different endpoints in a home network, for determining the presence of network components therein, and for determining the suitability of the endpoints to support various end devices.

SUMMARY OF THE INVENTION

Accordingly, the present invention relates to a method for measuring RF characteristics of a cable network, which includes an input port, a plurality of cable lengths, and a plurality of output ports comprising:

a) terminating each accessible input and output port with a remote module capable of transmitting test signals with a unique identifying portion to other remote modules via the cables, capable of measuring RF power levels of received signals from other remote transmitters, and capable of identifying the unique identifying portion to determine which remote transmitter corresponds to each measured RF power level;

b) determining RF power levels for test signals traveling between the input port and each of the output ports;

c) comparing each of the RF power levels to a threshold power level to determine whether the output port corresponding to the RF power level is suitable for operation of an end device.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
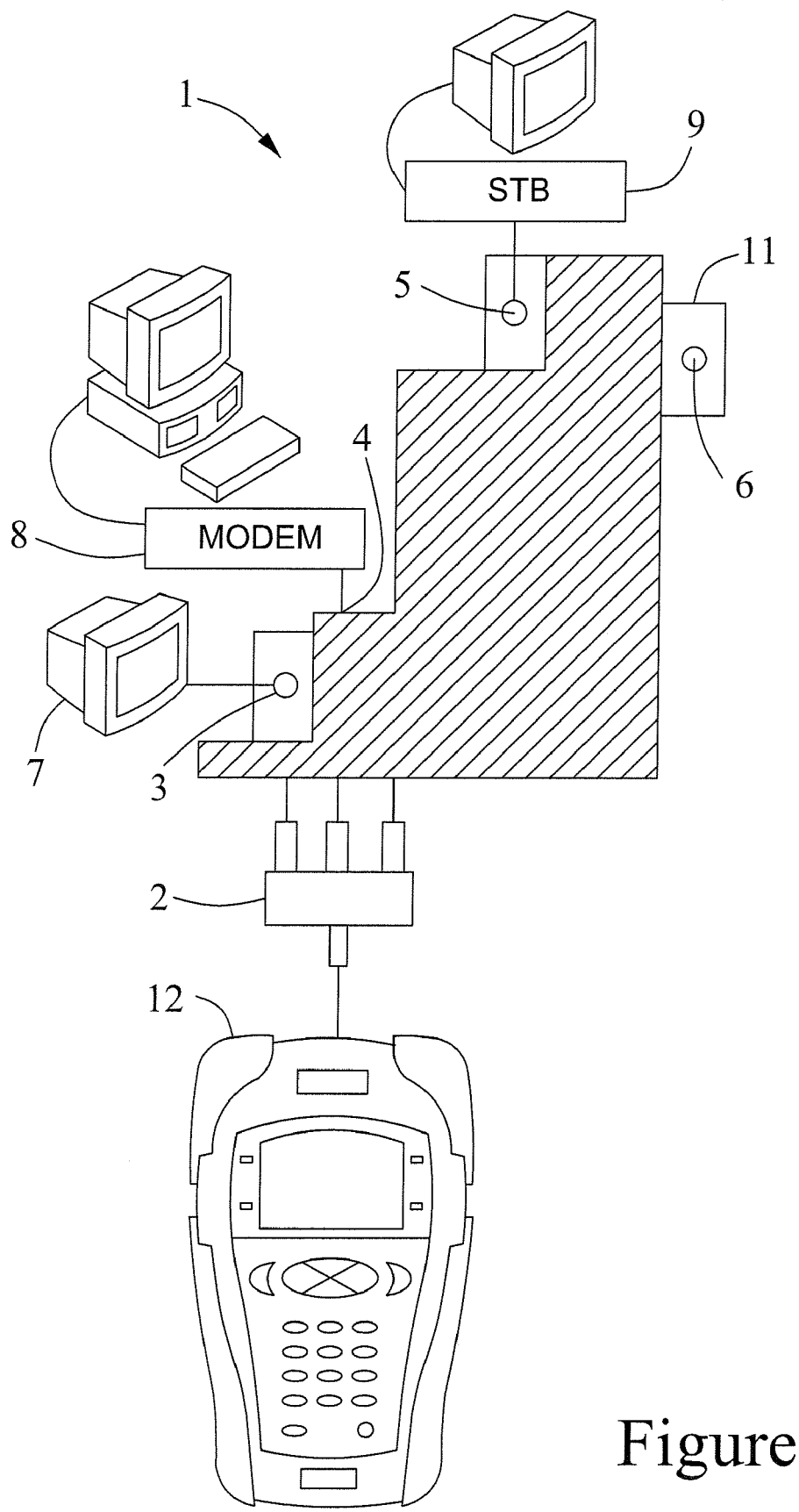
FIG. 1 illustrates a testing device in accordance with the present invention connected to a home network with known end points, but unknown topology.

FIG. 1 illustrates the challenge of characterizing wiring in a home network 1, in which the input to the network is accessible with a visible 3-way splitter 2, along with four visible network outputs 3 to 6 with outputs for a cable TV 7, a cable modem 8, a set top box (STB) 9, and unterminated wall plate connector 11. Unfortunately, the network topology, i.e. the number of additional splitters, cable losses, etc, is unknown; therefore, the suitability of the home wiring to support advanced services is also unknown.

Figure 2:
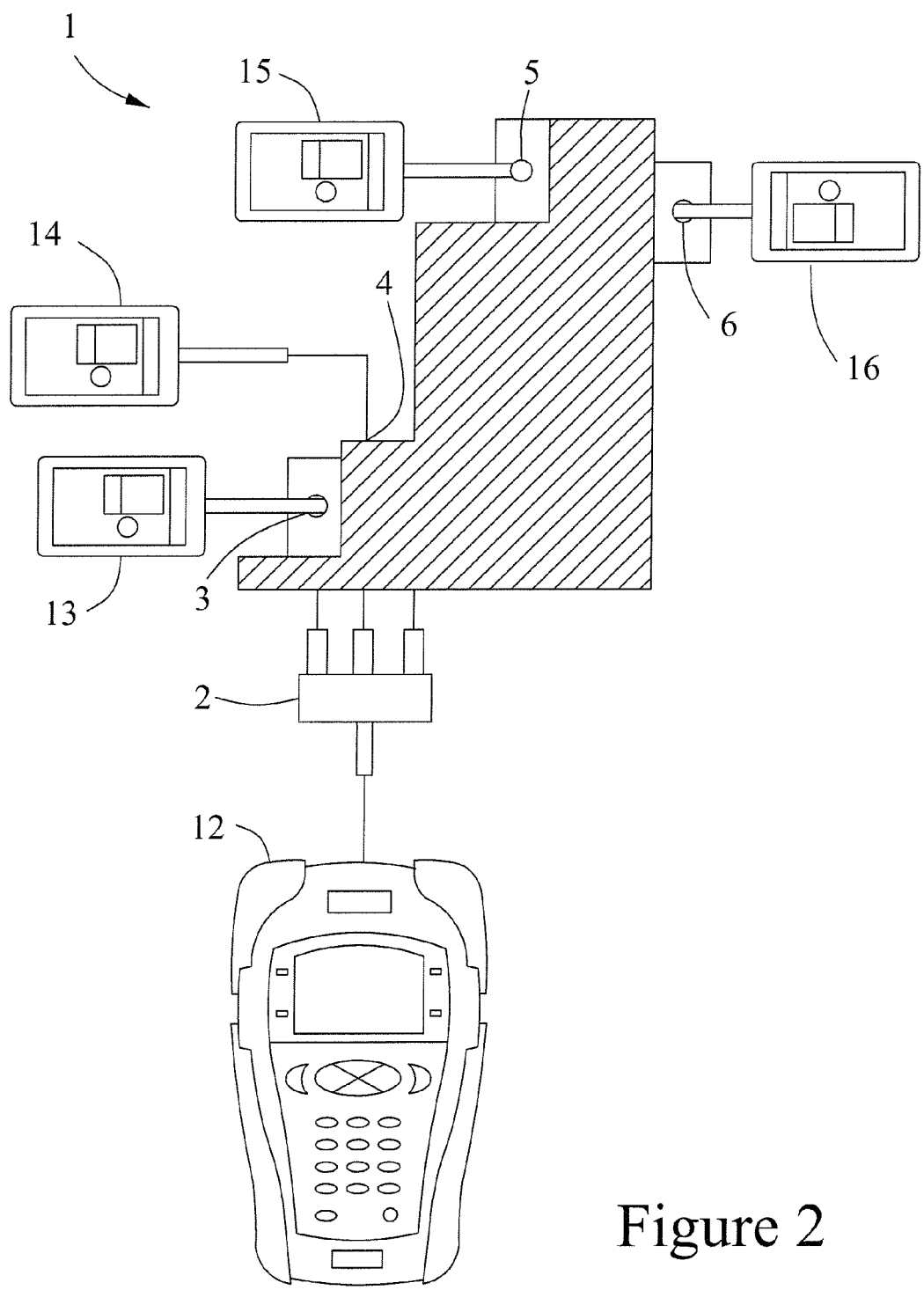
FIG. 2 illustrates the home network of FIG. 1 with wireless remotes connected to end points thereof.

With reference to FIG. 2, in order to characterize the wiring in the network 1 with test meter device 12, the technician attaches remote transmitter modules 13 to 16 to each available network output 3 to 6, respectively. The remotes 13 to 16 incorporate an ad hoc network technology communication system, e.g. Zigbee or Z-wave, into a housing with a rechargeable power source, a suitable cable connector, and a wireless antenna. ZigBee is the name of a specification for a suite of high level communication protocols using small, low-power digital radios based on the IEEE 802.15.4-2006 standard for wireless personal area networks (WPANs), such as wireless headphones connecting with cell phones via short-range radio. The technology is intended to be simpler and cheaper than other WPANs, such as Bluetooth. ZigBee is targeted at radio frequency (RF) applications that require a low data rate, long battery life, and secure networking. The physical layer manages the physical RF transceiver and performs channel selection and energy and signal management functions, while operating on one of three possible unlicensed frequency bands: 868-868.8 MHz: Europe; 902-928 MHz: North America; 2400-2483.5 MHz: worldwide use.

The original 2003 version of the standard specifies two physical layers based on direct sequence spread spectrum (DSSS) techniques: one working in the 868/915 MHz bands with transfer rates of 20 kbit/s and 40 kbit/s, and one in the 2450 MHz band with a rate of 250 kbit/s. The 2006 revision increases the maximum data rates of the 868/915 MHz ISM bands to support 100 kbit/s and 250 kbit/s.

Z-Wave is the interoperable wireless communication protocol developed by Danish company Zensys and the Z-Wave Alliance, and designed for low-power and low-bandwidth appliances, such as home automation and sensor networks. Z-wave has a bandwidth of 40 Kbits/s, and has GFSK modulation. The Z-wave radio uses the 900 MHz ISM band: 908.42 MHz (USA); 868.42 MHz (Europe); 919.82 MHz (Hong Kong); 921.42 MHz (Australia/New Zealand).

This technique could be employed at any frequency, but preferably within the normal cablevision range, i.e. 50 to 1000 MHz; however, chipsets that use 800 to 1000 MHz, and preferably the 900 MHz ISM band, are of greatest interest because they are generally near the upper limit of usable frequencies within the home coax network. The test meter device 12 contains a chipset using the same technology. Note that although these technologies are nominally used for wireless operation, in the proposed application they are connected over the home wiring network 1 itself.

Figure 3:
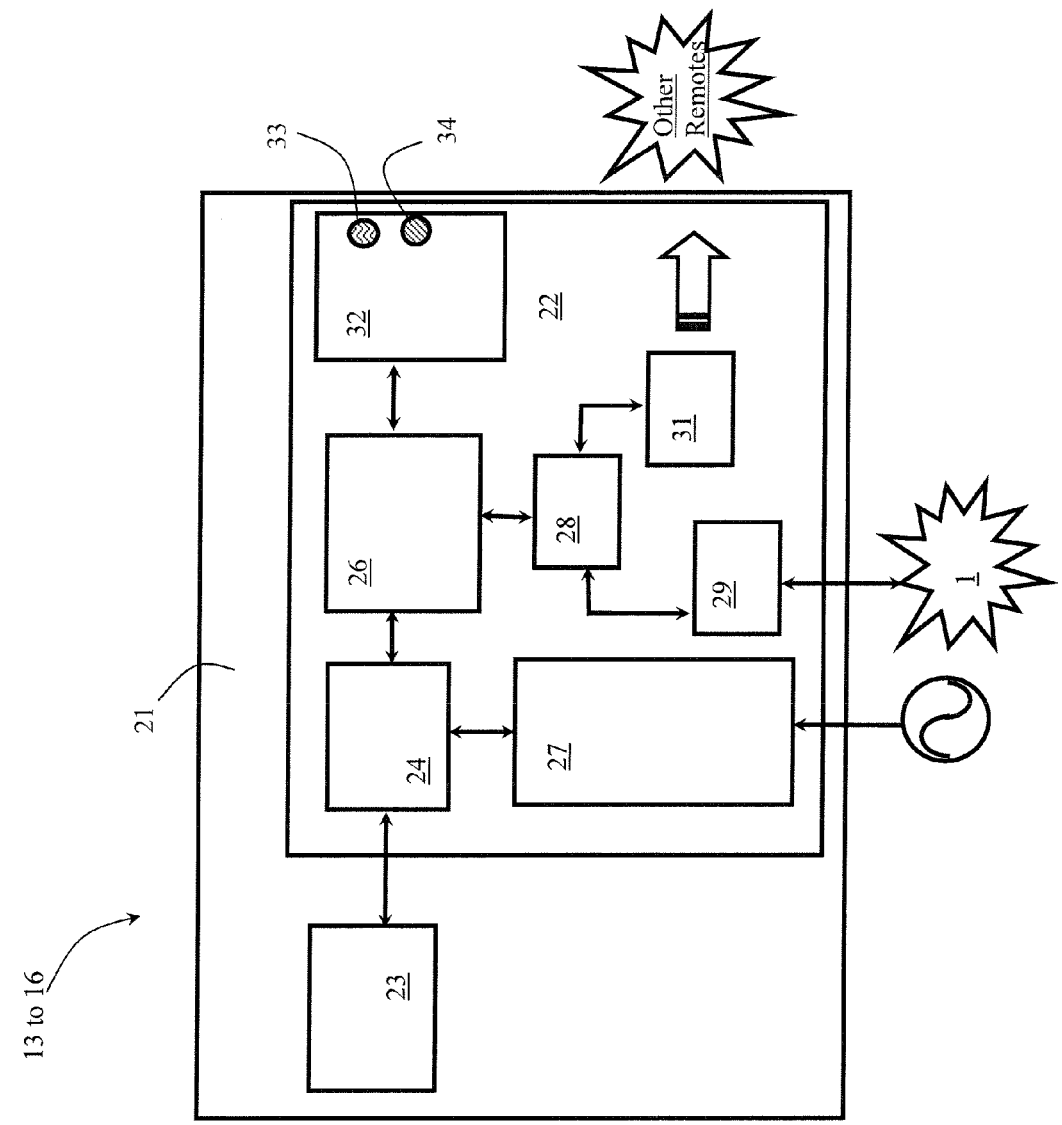
FIG. 3 is a schematic illustration of the wireless remotes of FIGS. 1 and 2.

With reference to FIG. 3, each remote module 13 to 16 includes a housing 21, which encloses a custom circuit board 22 and a battery pack 23. The circuit board 22 includes charge and power circuits 24 interconnecting the battery back 23 with a network communication module 26, e.g. Z-wave or Zigbee. An electrical port 27, e.g. USB port, is provided on the circuit board 22 to enable the battery pack 23 to be recharged via the charge and power circuits 24. An RF switch 28 is connected to the network communication module 26 for alternating between communications with the home network 1 via a suitable cable connector 29, e.g. an F connector, and communications with the wireless network between remotes via a stripline antenna 31. The network communication module 26, which includes a micro-controller and suitable memory is also connected to some form of user interface 32 for providing an indication of the status of the remote 13 to 16, e.g. different color (red and green) LED indicators 33 and 34 are provided to illustrate a pass or fail test. The network communication module 26 also includes a transmitter for generating and transmitting the RF test signals, and a receiver for receiving the RF test signals and converting them to electrical signals. A plurality of interfaces, e.g. general purpose input/output (GPIO) ports, are also provided on the network communication module 26 providing access to the various elements thereof. The receiver measures the received signal strength of the test signals, and the micro-controller stores the signal strength measurements along with their corresponding unique identification number in memory for future use.

Figure 4:
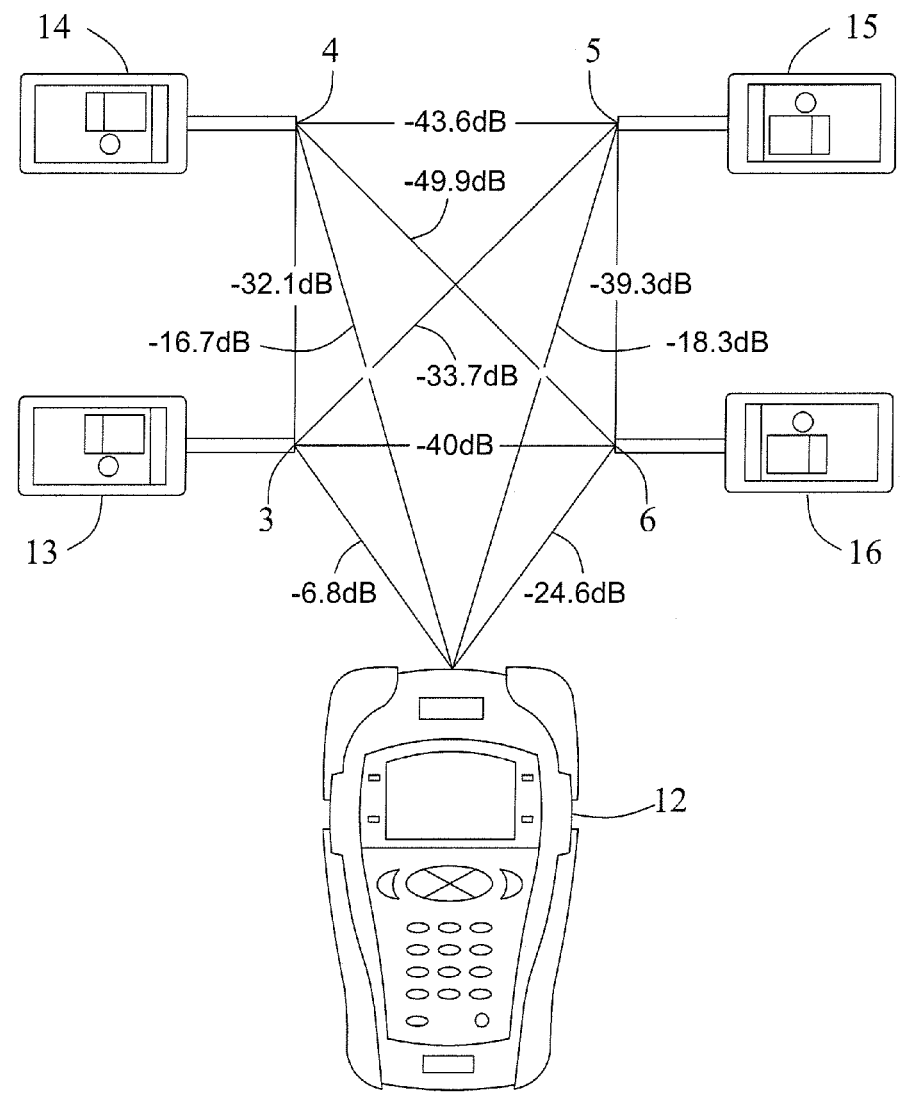
FIG. 4 illustrates the home network of FIGS. 1 and 2 with signal strength measurements between wireless remotes listed.

The remotes 13 to 16 and the test meter device 12, illustrated in FIG. 4, form an ad hoc network over the home wiring network 1, in which the test meter device 12 and each remote 13 to 16 transmit test signals to each other with unique identification (ID) numbers, and then measure the received signal strengths from all the other remotes 13 to 16 and the test meter device 12. The measurements are passed back to the test meter device 12, which may be operated as the network master, if applicable, via the home wiring network 1 and/or via wireless communication between the remotes 13 to 16. A simple software application executed in the micro-controller in each remote 13 to 16 will communicate the signal levels and ID numbers of the other remotes 13 to 16 forming a database in the memory thereof, which can be distributed to the test meter device 12 and all of the remotes 13 to 16, or the remotes 13 to 16 could be queried for this data by the test meter device 12. Each remote 13 to 16 could provide a single button/LED type selector in the user interface 32 for common room names to simplify mapping of remotes 13 to 16 to output points 3 to 6.

As part of the connection process, the remote modules 13 to 16 measure the Received Signal Strength (RSS) of each of the other remote modules 13 to 16. Since transmissions are made from each remote with a known transmit power, the amount of attenuation introduced by the home wiring network between remote modules 13 to 16 and between the test meter 12 and the remote modules 13 to 16 can be determined directly from the received signal strength. For improved RSS measurement accuracy, the remote modules 13 to 16 may incorporate step attenuators to be used in concert with the chipset's internal RSS indicator.

Segmented networks can be identified by alternately operating the remotes 13 to 16 in the "wired" mode described above and then in a conventional wireless mode outside the home wiring, thereby establishing the wireless ad hoc network, as well. In this way, a segmented or cut off remote (not shown) could report over the wireless network that it is unable to connect to any other remotes 13 to 16 over the home wiring network 1. An additional testing function is provided by the present invention by alternately operating each remote module 13 to 16 in the "wireless" mode and the "wired" mode. If connectivity between any two remote modules 13 to 16 could be established with one sending test signals along the wired home network 1, i.e. in wired mode, and one remote module receiving the test signals via the wireless antenna, i.e. in wireless mode, this would indicate an impairment in the cable network 1, e.g. a leak, a poorly shielded cable or unterminated endpoints; such networks are susceptible to reduced performance due to RF ingress.

Figure 5:
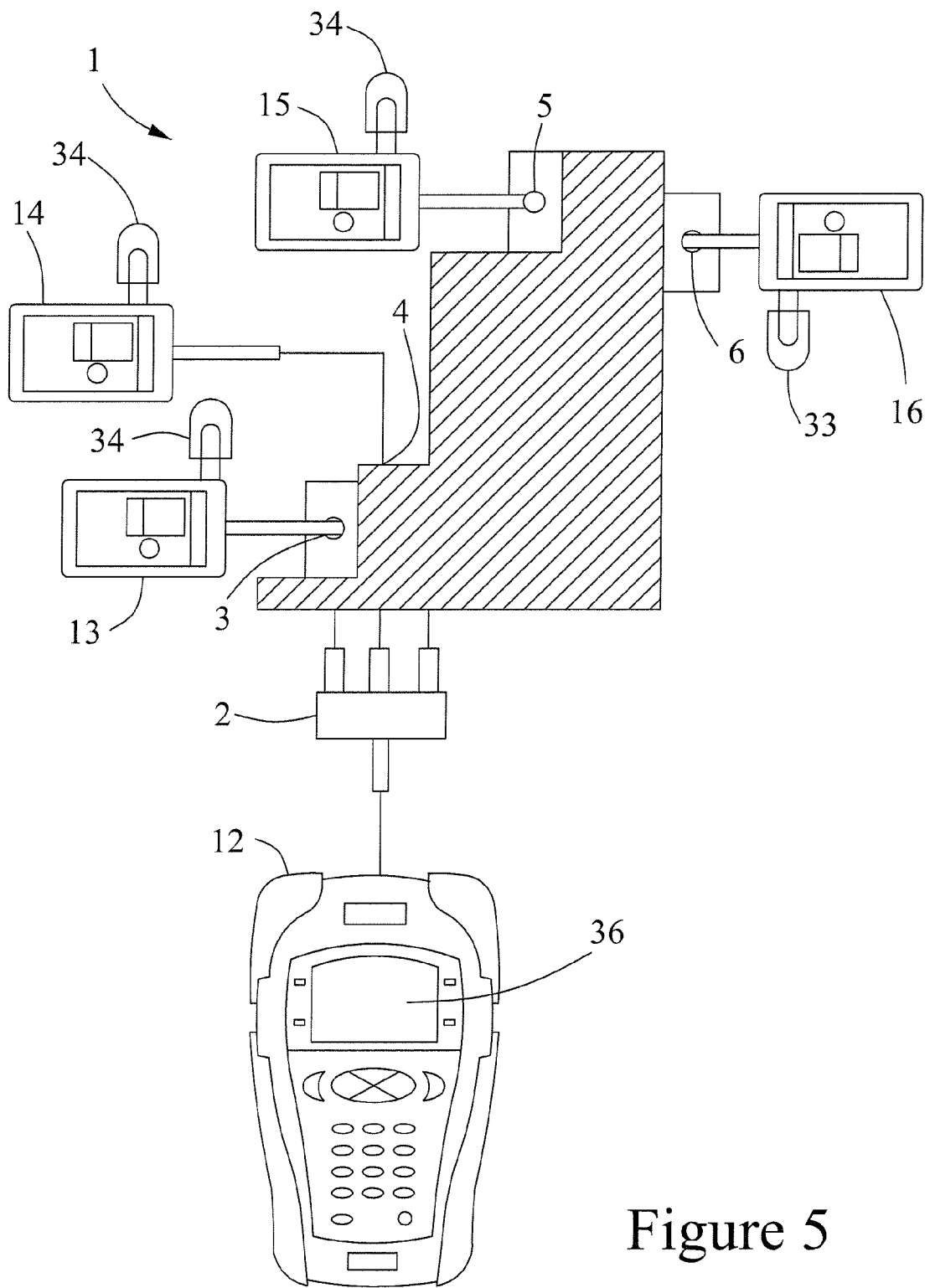
FIG. 5 illustrates the home network of FIGS. 1 to 4, in which the wireless remotes provide a visible indication of the suitability thereof.

Based on the RF attenuation between each remote 13 to 16 and all the others, the suitability of the endpoint to which it is attached for connecting a network PVR or other home networking device can quickly be determined by comparing the measured RF attenuation to a suitability threshold value, e.g. −20 dB, as illustrated in FIG. 5. The threshold value depends on the specific technology being tested for, i.e. some (MOCA) networks are true mesh networks, meaning all devices must be able to connect directly to all others, while some other networks, e.g. HPNA, are hub-and-spoke, so only the attenuation between the master and each endpoint is relevant.

For example, the RF attenuation between the test meter 12 and the remotes 13 to 16 are −6.8 dB, −16.7 dB, −18.3 dB and −24.6 dB, respectively, indicate that endpoints 3 to 5 would be suitable to sustain a suitable home network device, and that the fourth endpoint 6 is unsuitable for all home network devices. The suitability can be visually imparted to the technician via the user interface 32 on each remote 13 to 16, e.g. the red light 33 for unsuitable and the green light 34 for suitable, as illustrated, or reported on a display 36 on the test meter device 12 as a table or in a list. The comparison to the threshold value can be done at each remote 13 to 16 or the power reading (or attenuation reading) can be transmitted back to the network master, e.g. test meter device 12, for calculation. The test meter device 12 can simply display the results on a user interface, e.g. display screen 36, or send an indicator signal back to the remotes 13 to 16 for the appropriate signal light display 33 or 34.

Figure 6:
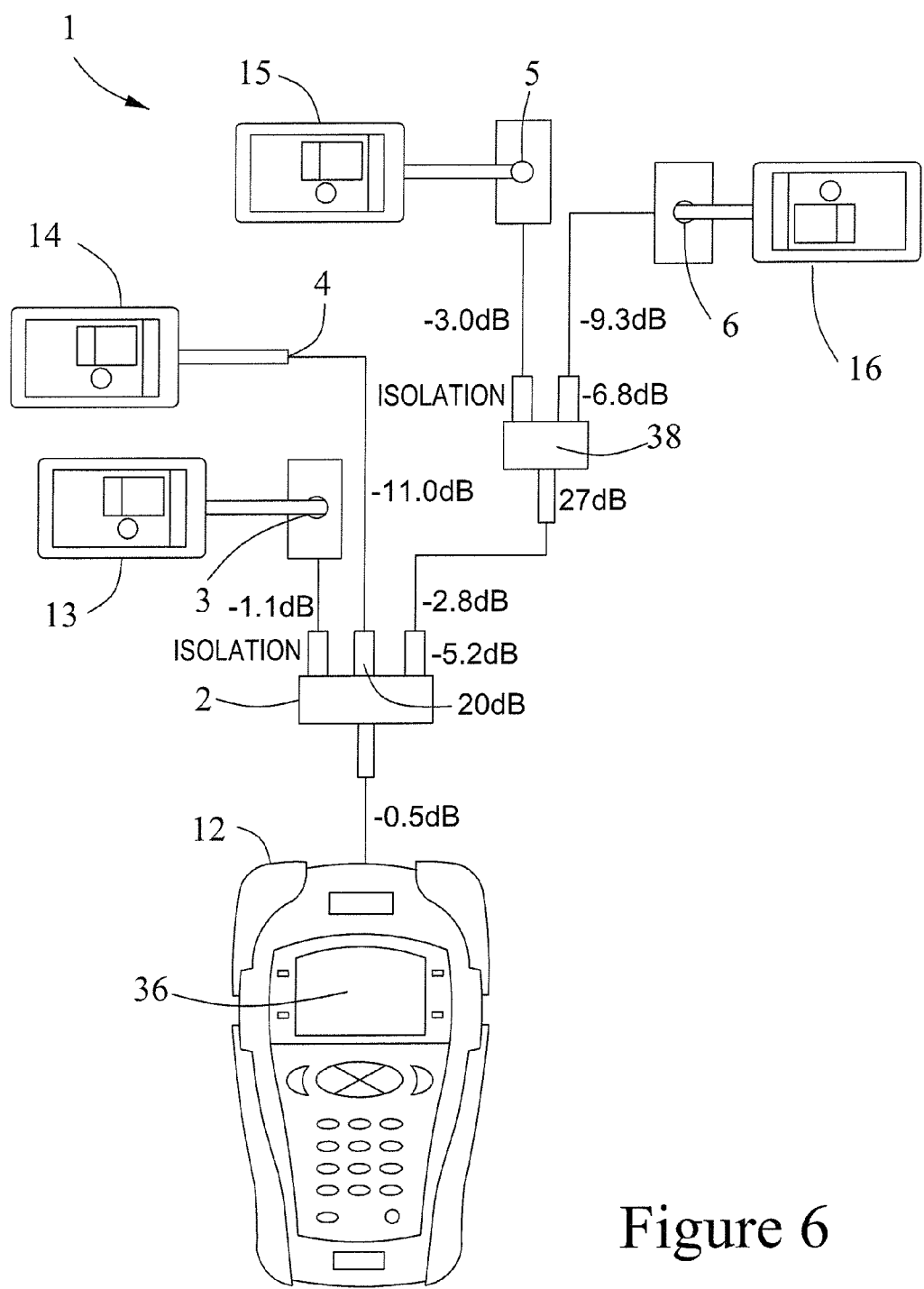
FIG. 6 illustrates the topology of the home network of FIGS. 1 to 5.

With reference to FIG. 6, comparing the measured RF attenuation measurements to known RF attenuation results for typical coaxial cable lengths and splitter, the elements and properties of the coax network, i.e. the topology, can be estimated or calculated by a control microcomputer in the test meter device 12. For example, the total attenuation between the test meter device 12 and the first remote 13 is −6.8 dB, and the attenuation of the visible 3-way splitter 2 is −5.3 dB and the one yard cable connecting the test meter device 12 and the 3-way splitter 2 is −0.5 dB. Accordingly, the remaining attenuation, i.e. −1.1 dB, is probably due to a length of coaxial cable, e.g. two yards long. Similarly, the total attenuation between the test meter device 12 and the second remote 14 is −16.7 dB, in which the 3-way splitter 2 is −5.2 dB and the test cable is −0.5 dB, leaving −11.0 dB, which could include another splitter, but is most likely a run of coaxial cable, approximately 10 yards long. The total attenuation between the test meter 12 and the third test meter device 15 is −16.7 dB, of which −5.2 dB is the 3-way splitter 2 and −0.5 dB is the initial test cable. Since there is only a 3-way splitter at the beginning of the network and there are four endpoints 3 to 6, the control system deduces that there is a two-way splitter 38 somewhere in the network, and −6.8 dB can be estimate for a low quality two-way splitter, leaving −5.8 dB from cable attenuation. A similar calculation is done for the fourth remote 16, whereby the difference in the length of the cables between the two-way splitter 38 and the endpoints 5 and 6 can be calculated by comparing the difference in attenuation between the test meter device 12 and the third and fourth remotes 15 and 16, e.g. −24.6 dB−−18.3 dB=−6.3 dB or 12 yards of cable difference. The total distance of the cable lengths between the two-way splitter and the endpoints 5 and 6 can then be calculated from the attenuation measurements between the other remotes 13 to 16, e.g. the attenuation measurements between the third remote 15 and the fourth remote 16 via the two-way splitter 31 is −39.3 dB, which equals −27 dB of isolation from the two-way splitter 31 plus −12.3 dB from the cable lengths. Since the attenuation of the cable length between the two-way splitter 38 and the third remote 15 is −6.3 dB less than the resistance of the cable length between the two-way splitter 31 and the fourth remote 16, the control microcomputer calculates the attenuation of the two cable runs as −3.0 dB and −9.3 dB, respectively, and that the cable lengths are approximately 6 yard and 18 yards, respectively. The estimate by the control microcomputer can be confirmed by a visual inspection by the technician by comparing the actual position of the first endpoint 13. Additional characterizing techniques, e.g. FDR measurements as disclosed in United States Patent Publication 2007/0290693, entitled Network Device Detection Using Frequency Domain Reflectometer, published Dec. 20, 2007 in the name of Gotwals et al., which is incorporated herein by reference, can be used to identify more complex systems, if required.

Figure 7:
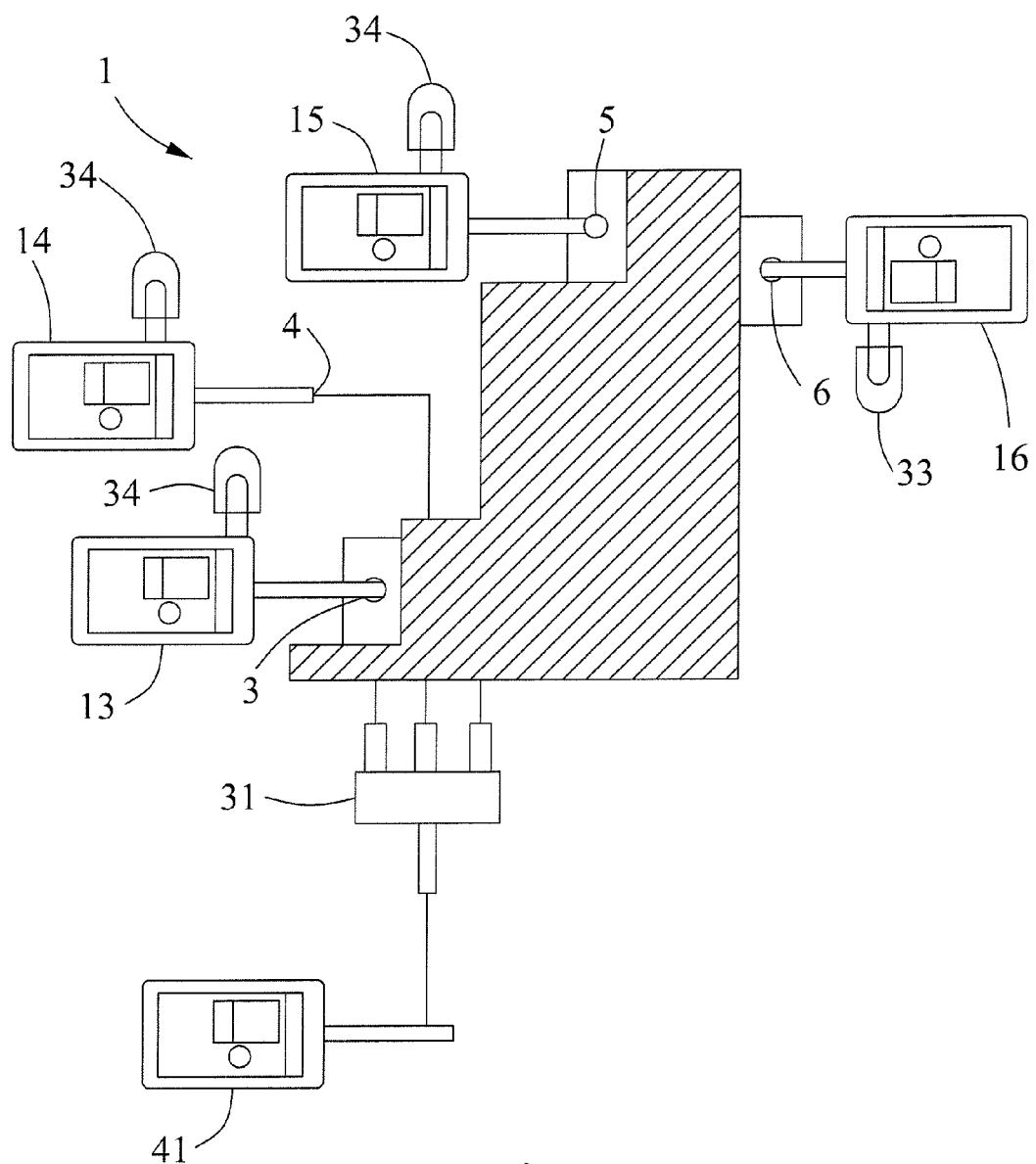
FIG. 7 illustrates an alternative embodiment for testing a home network.

An alternative, decentralized variation of the present invention is illustrated in FIG. 7, in which the test meter device 12 is replaced as the network master by a master node remote 41. Utilizing the master node remote 41 is most appropriate for verifying the suitability for hub-and-spoke network configurations, where each remote 13 to 16 need only have a sufficiently good connection to a unique "master node" 41. In this embodiment, the signal level measurement results need not be distributed around the network 1. Each remote 13 to 16 can indicate pass/fail via the respective indicator lights 33 and 34, as hereinbefore detailed, based on the level of the transmission from the master node 41.

I claim:

1. A method for measuring RF characteristics of a network, which includes an input port, a plurality of cable lengths, and a plurality of output ports comprising:
   a) terminating each input and output port with a remote transmitter capable of transmitting test signals with a unique identifying portion to the other remote transmitters via the cables, capable of measuring RF power levels of received signals from other remote transmitters, and capable of identifying the unique identifying portion to determine which remote transmitter corresponds to each measurec RF power level;
   b) determining RF power levels for test signals transmitted between the input port and each of the output ports;
   c) transmitting the RF power levels determined by each remote transmitter to a test meter including a control system;
   d) determining lengths of cables and positions of splitters in the network based on the RF power levels;
   e) comparing each of the RF power levels between the input and output ports to a threshold power level to determine whether the output port corresponding to the RF power level is suitable for operation of an end device.

2. The method according to claim 1, further comprising transmitting test signals from one of the remote transmitter into the cable network; and determining whether other remote transmitter receive the test signals via a wireless antenna for identifying the existence of an impairment in the cable network.

3. The method according to claim 1, further comprising displaying an indication on a display screen of the test meter of whether the comparison of the threshold power level to the RF power level of the test signal from the input port indicates that the output port is suitable for operation of an end device.

4. The method according to claim 1, wherein step b) includes determining RF power levels for test signals transmitted between each of the output ports.

5. The method according to claim 1, wherein each remote transmitter includes a network communication module with a transmitter and a receiver;
   a connector for attaching the remote to a network cable; and an antenna for transmitting and receiving signals.

6. The method according to claim 4, wherein step d) includes:
   i) receiving the RF power levels for the test signals between the input port and the output port at a test meter; and
   ii) determining the length of cable and the existence of a splitter based on known resistance measurements stored in memory in the control system.

7. The method according to claim 1, further comprising transmitting an acknowledgement signal from each remote transmitter to the test meter through the air in a wireless mode, to ensure all of the remote transmitters are connected to the input port.

* * * * *